United States Patent [19]

Puppolo et al.

[11] 4,385,342
[45] May 24, 1983

[54] FLAT ELECTROLYTIC CAPACITOR

[75] Inventors: Henry F. Puppolo, North Adams; Phyllis M. Schmidt, Williamstown, both of Mass.

[73] Assignee: Sprague Electric Company, North Adams, Mass.

[21] Appl. No.: 148,627

[22] Filed: May 12, 1980

[51] Int. Cl.³ .............................................. H01G 4/32
[52] U.S. Cl. .................... 361/433; 361/306; 361/308
[58] Field of Search ................ 361/433, 306, 308; 429/162, 164

[56] References Cited

U.S. PATENT DOCUMENTS

| 2,458,878 | 1/1949 | Ruben | 429/164 |
| 2,531,185 | 11/1950 | Wurster | 361/306 |
| 2,593,893 | 4/1952 | King | 429/164 |
| 2,611,793 | 9/1952 | Simpson | 429/164 |
| 2,648,717 | 8/1953 | Ross et al. | 429/164 |
| 2,740,821 | 4/1956 | Bone | 429/162 |
| 2,814,661 | 11/1957 | Paillet | 429/162 |
| 2,966,538 | 12/1960 | Bernot | 429/162 |
| 3,024,394 | 3/1962 | Salisbury | 361/433 |
| 3,654,524 | 4/1972 | Puppolo et al. | 361/433 |
| 3,981,748 | 9/1976 | Margalit | 429/164 |

FOREIGN PATENT DOCUMENTS

| 992625 | 7/1976 | Canada . | |
| 87271 | 11/1920 | Switzerland | 429/162 |
| 554926 | 7/1943 | United Kingdom . | |
| 1372323 | 10/1974 | United Kingdom . | |

Primary Examiner—R. A. Rosenberger

[57] ABSTRACT

A wound and flattened extended-foil section containing an electrolyte is encased within a frame of insulating material that is closed on the top and bottom by metallic members electrically insulated and spaced from each other by the frame. One electrode of the section is electrically connected within the frame to one of the metallic members, and the other electrode is electrically connected within the frame to the second metallic member. The metallic members may serve as terminals for the capacitor, or leads may be attached to their external surfaces.

6 Claims, 6 Drawing Figures

FLAT ELECTROLYTIC CAPACITOR

BACKGROUND OF THE INVENTION

This invention relates to a flat electrolytic capacitor that has a wound and flattened extended foil section containing electrolyte encased between and electrically connected to two metallic members electrically insulated and spaced from each other. More particularly, this invention relates to a flat aluminum capacitor that has low inductance, low equivalent series resistance, and improved volumetric efficiency.

There is increasing need for capacitors in the power supply and computer fields that have low inductance, low equivalent series resistance, and improved packaging density over cylindrical capacitors. It is desirable that such capacitors can be manufactured on a large scale relatively inexpensively in uniform packages which can be connected in series, parallel, or series parallel to provide high energy or high-energy-high voltage packages.

Prior art capacitors that have low-inductance and low equivalent series resistance have not been volumetrically efficient or provided the desired packaging density. Those that have provided good packaging density, e.g., number of capacitors per unit area, have required additional encasement to provide rigidity.

SUMMARY OF THE INVENTION

A feature of this invention is the provision of a flat electrolytic capacitor, preferably aluminum, that has low inductance, low impedance, low equivalent series resistance, and high volumetric efficiency. Another feature of this invention is the provision of such a capacitor that can be connected in series, parallel or series-parallel to make high-energy or high energy-high voltages packages.

Still another feature of this invention is to provide a flat capacitor in which the case can serve as terminals, or leads can be attached to the exterior of the case, as no leads or terminals protrude through the casing.

These objects are accomplished by providing a wound and flattened foil section containing an electrolyte. Preferably, the section is an extended foil one that has the extended edges of the anode foil welded together in at least one place and the extended edges of the cathode foil similarly welded together. One of the interwound foils extends lengthwise beyond the other foil winding so that one foil ends on one side of the flattened section and the other foil ends on the other side of the flattened section.

The capacitor section is encased between two metallic members, and one of the electrodes is electrically connected to one of the members and the other electrode, to the second member. The metallic members are spaced from each other by electrical insulating means and individually sealed thereto.

DESCRIPTION OF THE PREFERRED EMBODIMENTS

Figure 1:
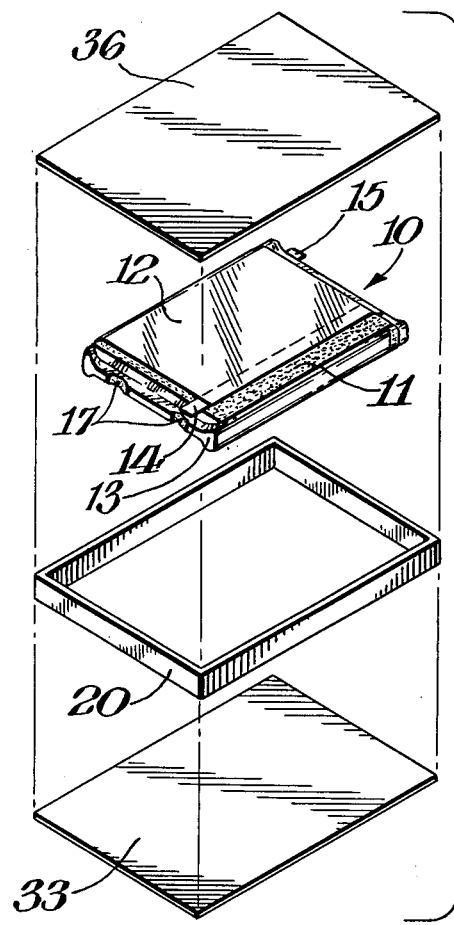
FIG. 1 shows an exploded view of the capacitor of the present invention.

An extended-foil capacitor section 10, as shown in FIG. 1, prepared by winding an anode foil electrode 12 and a cathode foil electrode 13 with interleaved spacer material 11, preferably paper, flattened and impregnated with electrolyte (not shown) is surrounded by a separating and insulating member 20, preferably a frame. The end of the anode foil electrode 12 lies on one side of flattened unit 10 and the end of the cathode foil electrode 13 lies on the other side. Preferably electrode tabs 14 and 15 are attached respectively to the ends of the anode foil electrode 12 and cathode foil electrode 13. The edges of the cathode foil electrode 13 extend from one side of the wound unit and are welded 17 in at least one place along the edge, and the edges of the anode foil electrode 12 extend from the opposite side of the unit and are similarly welded (not shown).

The capacitor section 10 is electrically connected to metallic members 33 and 36 preferably via electrode terminations 14 and 15. The metallic members 33 and 36 correspond in size to that of frame opening and are preferably copper-clad aluminum sheets positioned so that the aluminum side of each faces capacitor section 10, and the electrical connections between capacitor section 10 and the metallic members 33 and 36 are made to the aluminum sides. The copper sides form external surfaces of the unit. The metallic members 33 and 36 are then sealed to the top and bottom of the insulating means 20 to completely enclose the unit.

Figure 2:
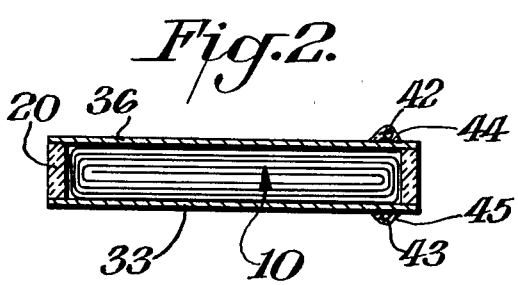
FIG. 2 shows a cross-section of the capacitor with external leads attached.

The external surfaces of metallic members 33 and 36 may serve as terminals themselves or leads 42 and 43 may be attached as shown in FIG. 2, e.g. by solder 44 and 45.

Figure 3:
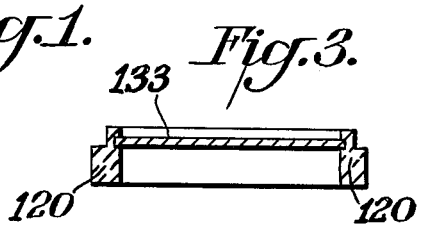
FIG. 3 shows a cross-section of a partially assembled top of a second embodiment.
Figure 4:
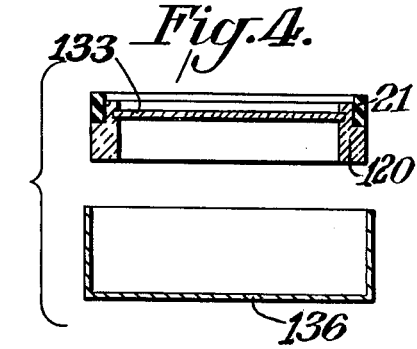
FIG. 4 shows an exploded view of the mating top and bottom case portions of the second embodiment of the present invention.

Alternatively, as shown in FIG. 3, one metallic member 133 may be molded with the insulating means 120. A rubber gasket 21 is placed around the outer periphery as shown in FIG. 4, and the second metallic member 136 may be formed as a shallow can into which the above structure snugly fits. Before such assembly, the capacitor section 10 is electrically connected to the metallic members 133 and 136 as above, and the unit is assembled by placing the section inside the insulating means 120, placing it into the shallow can and rolling over the upper edges of metallic member 136 over gasket 21 to provide an edge seal as shown in FIG. 5.

Figure 5:
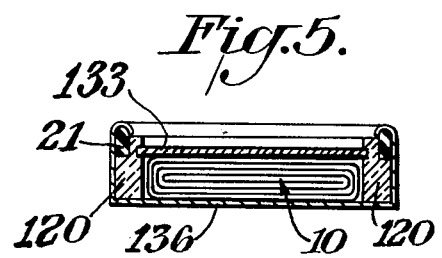
FIG. 5 shows the finished capacitor of FIG. 4.
Figure 6:
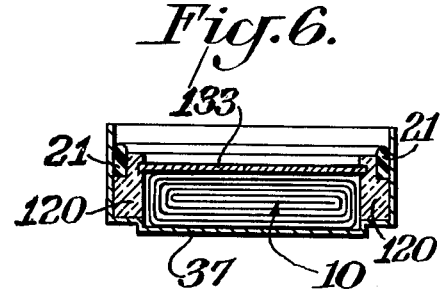
FIG. 6 shows a second embodiment of FIG. 5.

If it is desired to form a nest of capacitors automatically connected in series, then, as shown in FIG. 6, metallic member 136 of FIGS. 4 and 5 is formed as a shallow can 37 with a depression that fits flush onto metallic member 133 inside the rim formed by the edge seal and insulating means 120 and gasket 21. The top edge of metallic member 37 is then rolled over the gasket as in FIG. 5.

The resulting capacitors have high volumetric efficiency as there is little space between the section and the package. The shape of the finished capacitor allows more capacitors of a given rating to be used in the same space as fewer cylindrical ones, i.e., improved packaging density. The embodiment shown in FIG. 6 permits stacking in a nest and automatic series connection.

Because the capacitor section is of the extended foil type with edges welded together, the equivalent series resistance is low as the edge welds decrease the resistance of the foil. Low inductance is obtained by internal section design, i.e., the welded edges and large foil tabs connected either directly to the case or through electrode terminations. The uniform spacing of the metallic members, i.e., the distance between them and their distance from the section, contributes to the low inductance, less than 1 nano-henry.

This capacitor is particularly useful for power supplies, computers, and other applications where there is a need for low equivalent series resistance at high frequencies, that is, a high resonance point and low impedance, coupled with low inductance.

The capacitor is shown in the Figures to be rectangular, but it may be square, oval, or round; the rectangular or square forms are preferred because of higher volumetric efficiency. Whatever the shape, the capacitor section is completely enclosed by the frame and the metallic members, and no leads protrude through the resulting case.

Copper-clad aluminum is the preferred material for the metallic members as it provides aluminum surfaces facing the aluminum capacitor section so there is no galvanic couple. It also provides an outer surface that can serve as terminals per se or to which leads can be easily welded or soldered. However, other materials can be used such as other cladded combinations with aluminum, all aluminum members, or tantalum when the capacitor section is tantalum.

The insulating means may be a thermoplastic and/or thermosetting material such as nylon, polypropylene, a phenolic, a perfluoroethylene, polyphenylene sulfide or the like that is chemically resistant to capacitor electrolytes. When the capacitor section is aluminum, a filled phenolic and desirably a high-temperature mineral- or glass-filled phenolic is preferred. When the capacitor section is tantalum, a member of the Teflon family, such as Teflon itself or perfluoroalkoxyperfluoroethylene, is preferred.

What is claimed is:

1. A flat electrolytic capacitor comprising a frame of insulating material surrounding a wound and flattened extended aluminum foil capacitor section containing an electrolyte, the edges of a first electrode foil of said section that extend beyond a second electrode foil of said section along one side of said section being welded together in at least one place along said side, the edges of said second electrode foil that extend beyond said first foil on the opposite side of said section being similarly welded, each electrode foil terminating in an electrode tab, one metallic member electrically connected to said first electrode foil through one of said tabs and bonded completely around the upper surface of said frame, and a second metallic member electrically connected to said second electrode foil through the other of said tabs and bonded completely around the bottom surface of said frame, whereby no electrical connection protrudes through the case, said frame separates said metallic members, and the exterior of each said metallic member serves as a terminal for said capacitor.

2. A capacitor according to claim 1 wherein a lead is attached to the external surface of each of said metallic members.

3. A capacitor according to claim 1 wherein said frame is a filled phenolic material.

4. A capacitor according to claim 1 wherein both of said metallic members are copper-clad aluminum.

5. A capacitor according to claim 1 wherein one of said metallic members and insulating means are molded to form an insulating frame around said metallic member and bonded thereto and the other of said metallic members is formed into a shallow can adapted to snugly receive said frame but extending vertically above it, a gasket is positioned about the periphery of said frame adjacent the level of said metallic element bonded thereto, and said vertical extensions of said other metallic member are rolled over said gasket forming an edge seal.

6. A capacitor according to claim 5 wherein said shallow can is formed with a depression in its lower surface corresponding to a depression formed by said edge seal, said gasket, and said frame.

* * * * *